United States Patent [19]

Sljusar

[11] 3,929,355
[45] Dec. 30, 1975

[54] PIVOTAL PIPE JOINT
[76] Inventor: Anatoly Emelyanovich Sljusar, ulitsa B. Khmelnitskogo, 84, kv. 5, Belgorod, U.S.S.R.
[22] Filed: Apr. 4, 1974
[21] Appl. No.: 457,758

[52] U.S. Cl. .................. 285/39; 285/266; 285/308; 285/317; 285/320; 285/DIG. 16; 285/DIG. 21
[51] Int. Cl.² ......................................... F16L 35/00
[58] Field of Search ............ 285/261, 266, 317, 18, 285/105, 104, 110, 264, 319, 320, 308, 321, DIG. 21, 39

[56] References Cited
UNITED STATES PATENTS

| 198,402 | 12/1877 | Morsden | 285/317 |
|---|---|---|---|
| 1,266,061 | 5/1918 | Scoville | 285/264 X |
| 2,085,922 | 7/1937 | Moore | 285/266 |
| 2,556,659 | 6/1951 | Patterson | 285/261 X |
| 3,215,454 | 11/1965 | Hayes | 285/317 X |
| 3,663,043 | 5/1972 | Walton | 285/264 X |

*Primary Examiner*—Dave W. Arola
*Attorney, Agent, or Firm*—Haseltine, Lake & Waters

[57] ABSTRACT

The disclosed pivotal pipe joint may be effectively used for jointing casing pipes at surface and underwater drilling, as well as in construction of pipelines.

The pivotal pipe joint includes a female coupling member secured to one of the pipes being jointed, a male coupling member secured to the other pipe and a spherical ring received in the spherical socket of the female member. The male member is received in the bore of the spherical ring and is connected therewith by locking members accomodated simultaneously in grooves made, respectively, in the ring and in the male member, the grooves being aligned and facing each other at the final stage of connection of the two pipes.

Connection of the spherical ring and male member by the locking members is effected quickly, simply and reliably; furthermore, the disclosed joint can be used for connecting pipes of a large diameter.

19 Claims, 33 Drawing Figures

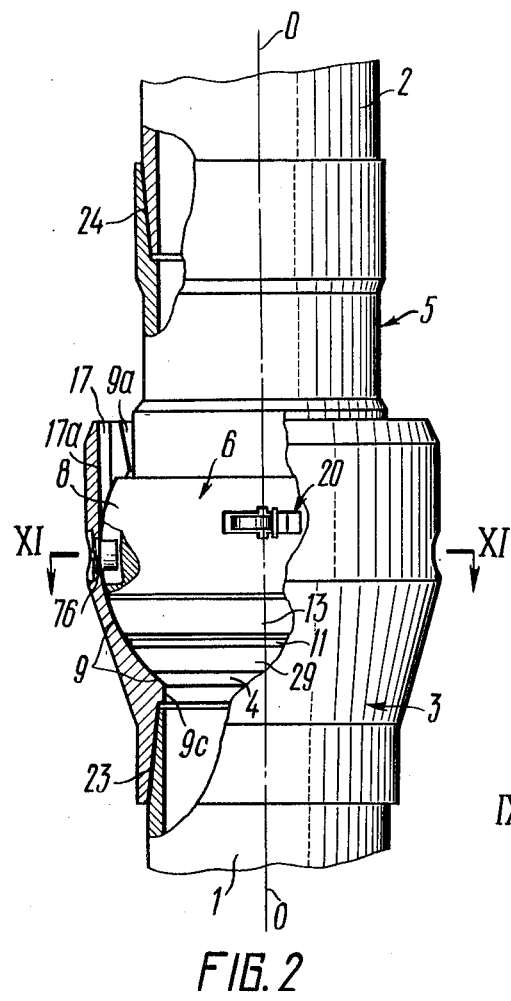
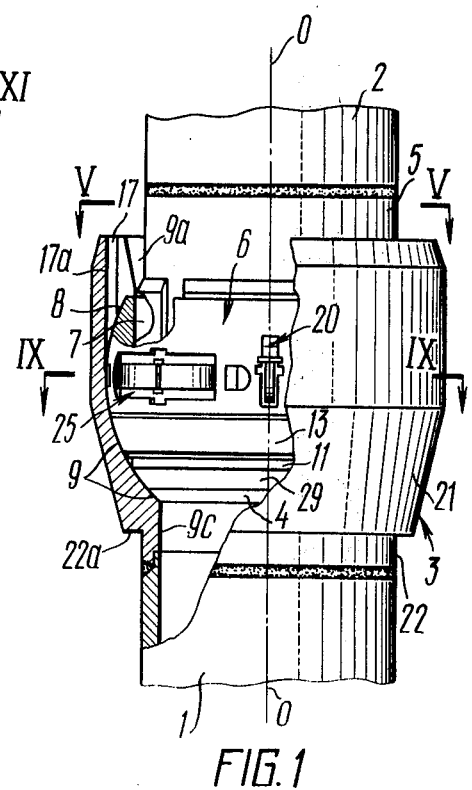
FIG. 2
FIG. 1

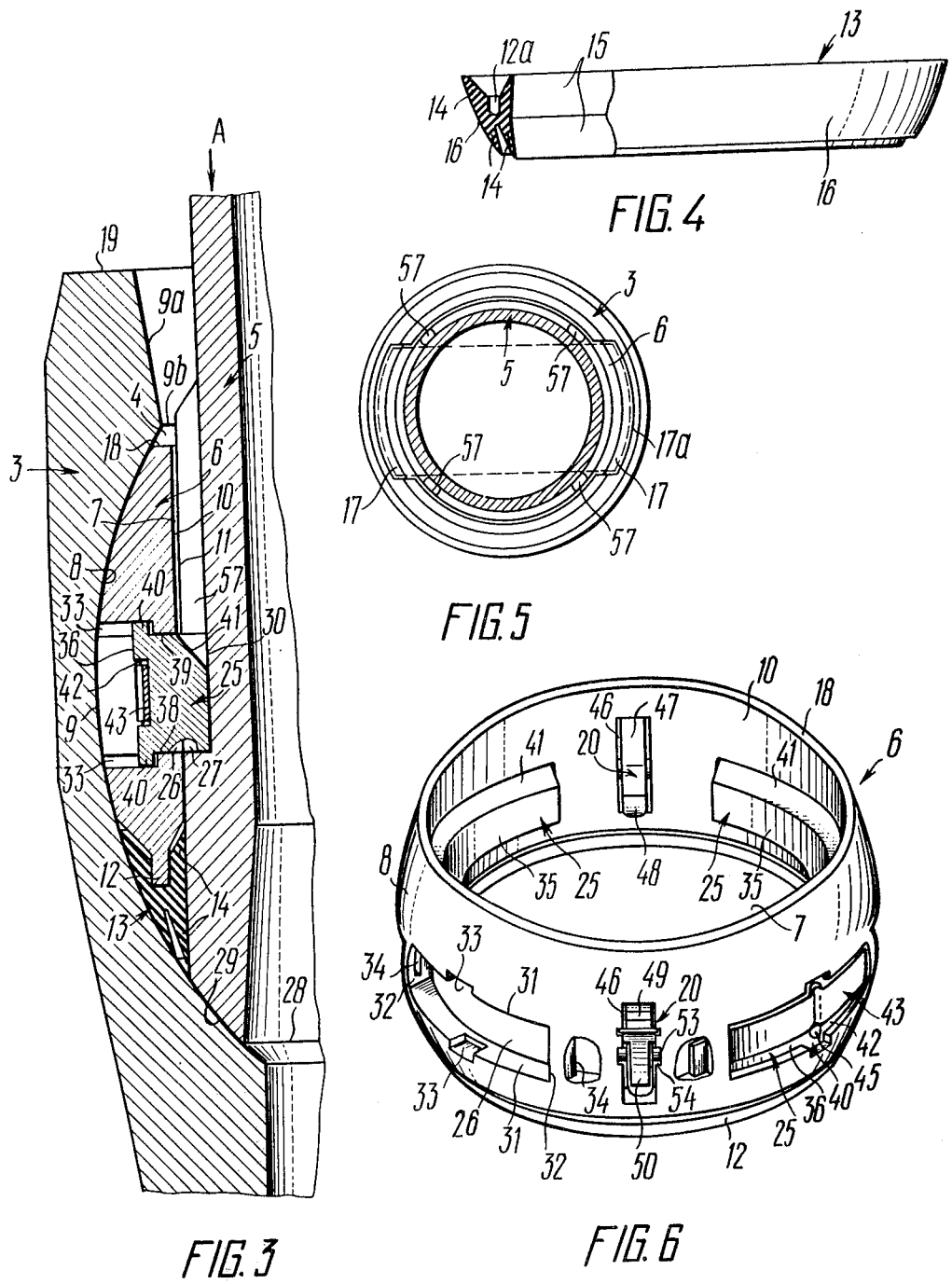

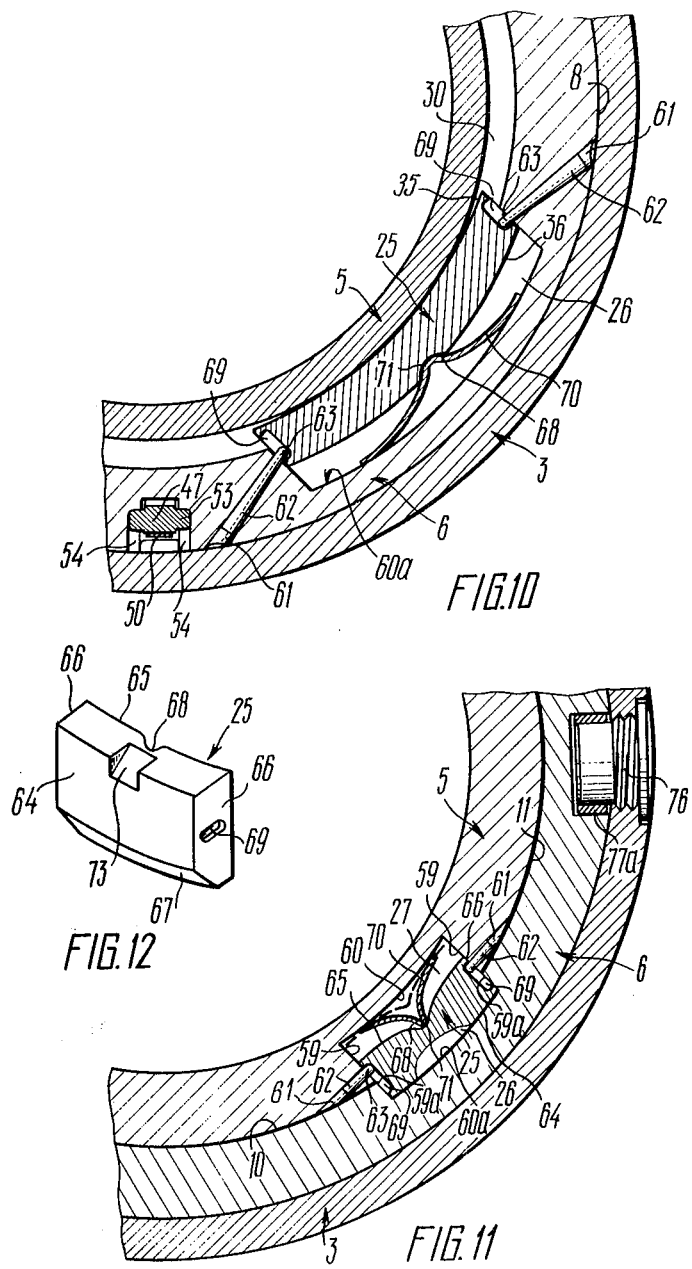

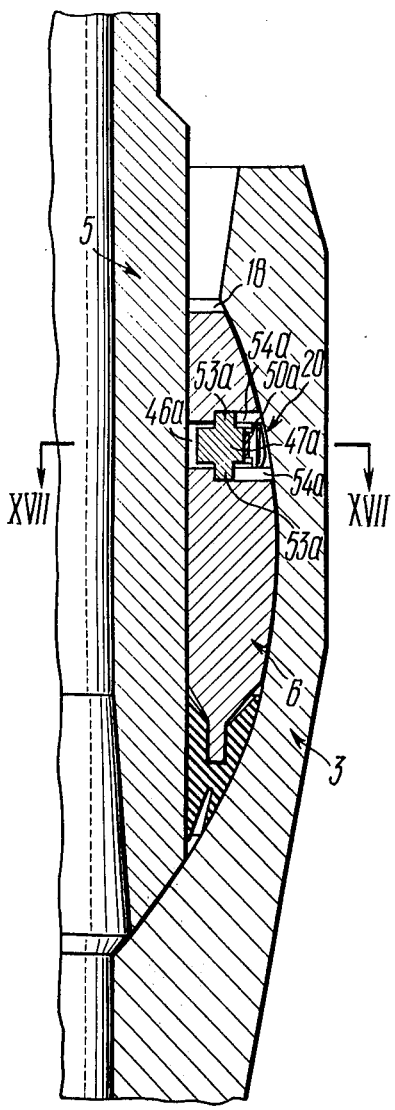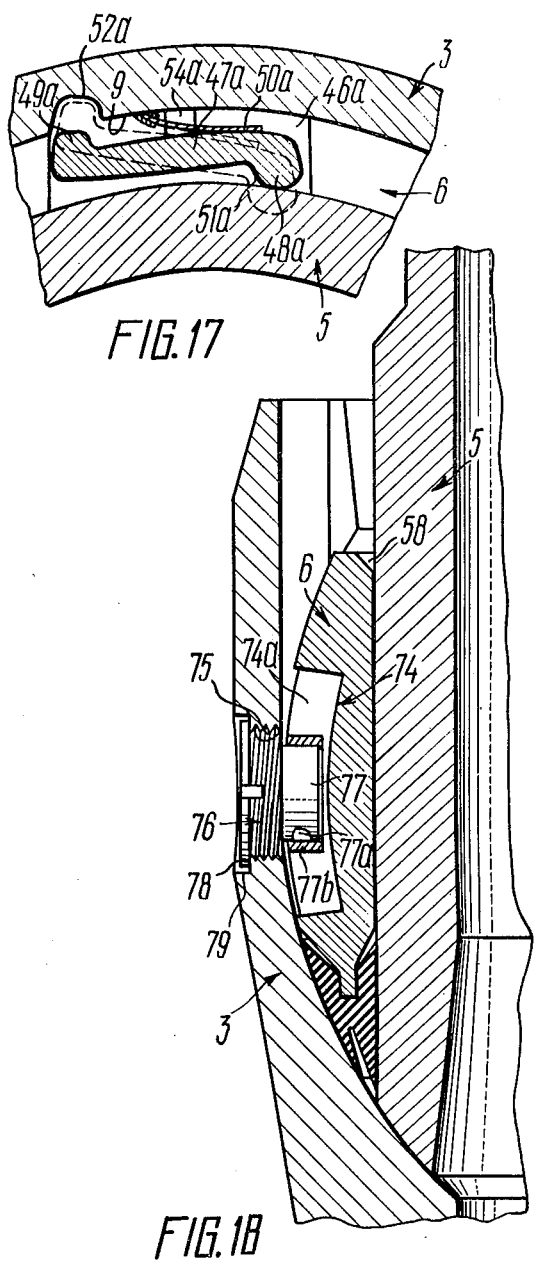

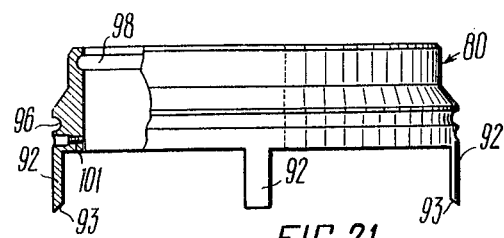
FIG. 21
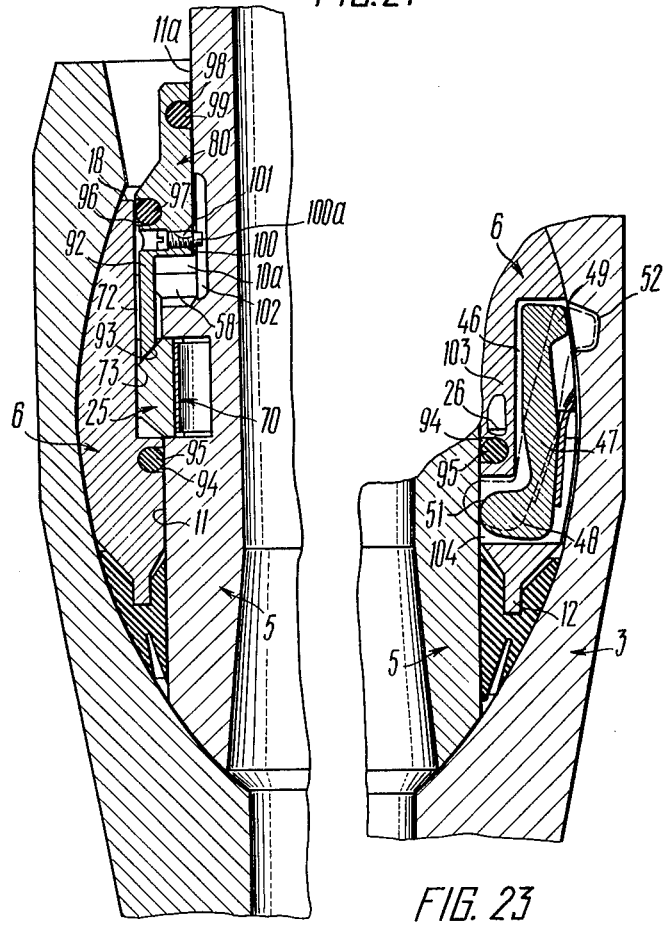
FIG. 22
FIG. 23

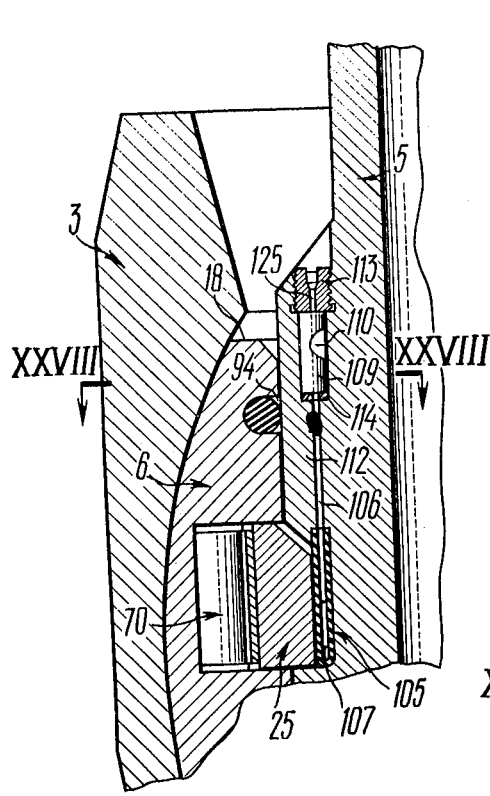
FIG. 26
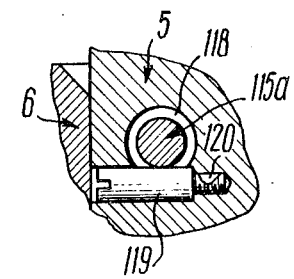
FIG. 29
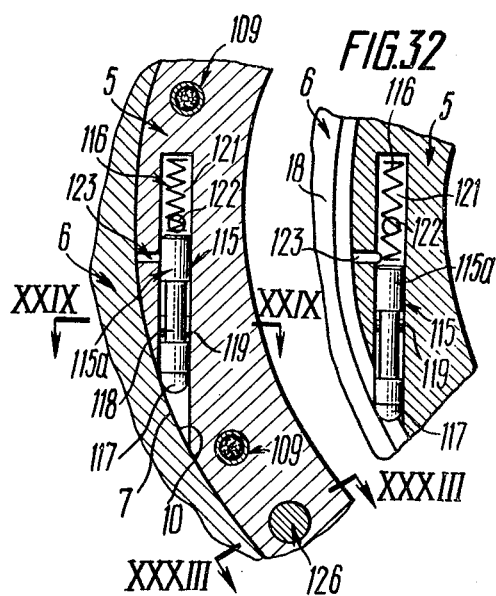
FIG. 32
FIG. 28
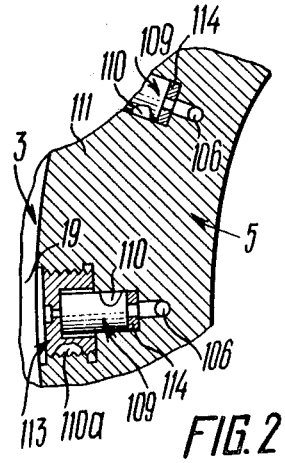
FIG. 27

PIVOTAL PIPE JOINT

The present invention relates to pivotal pipe joints and may be effectively used for jointing casing pipes, including coaxial ones, both in surface drilling and in underwater drilling, as well as for jointing pipes in ground-supported pipelines, as well as in pipelines included into the structure of stationary and mobile objects, wherever there is required connection of pipes providing for pivotal motion of the connected pipes with two or three degrees of freedom, as well as quick assembling and disassembling of the joint.

At present, reinforcing of boreholed with casing pipes, particularly, with large-diameter ones in excess of 0.3 m is complicated by the fact that as the diameter of the pipes is increased, there sharply increases the flexural rigidity or stiffness of the casing string, which impedes self-orientation of the casing string in conformity with bending of the borehole, which may be either natural, i.e. due to geological reasons or made on purpose (e.g. at performing directed drilling with various technical means).

A casing string made of pipes connected with rigid joints (either welded or threaded) more often than not has three-dimensionally bent configuration on account of both non-rectilinearity of the pipes itself within their manufacturing tolerances and of misalignment of the pipes in the joints owing to geometrical errors in manufacturing and assembling of these joints.

When a bent borehole is cased with a bent stiff casing string, an emergency is not uncommon, viz. the string sticks or "hangs" in the borehole and would not be lowered to a required depth. To eliminate such "hanging" the borehole is to be drilled to an increased diameter. However, such drilling is less effective and raises the cost of the drilling job.

One of the promissing approaches to reducing the hazards connected with casing of large-diameter boreholes with pipes is provision of casing strings offering local flexibility at the joints of the pipes, to prevent hanging of the casing string in a bent borehole and to eliminate dangerous bending stresses in the pipes and in their joints.

Numerous attempts to solve the problem of providing local flexibility of a casing string by means of pivotal pipe joints have already been made. One of the acceptable solutions is a pivotal pipe joint including a female member receiving therein a spherical ring threadedly connected with a male member and sealed in the socket with an elastic sealing member. The female member includes assembly-wise end grooves, providing for inserting of the spherical ring and turning the latter in the lateral plane of the socket. The wall of the female member and the spherical ring have cut therein aligned openings into which there are inserted from outside corresponding retaining members, as the male member is threaded into the spherical ring. Both the female member and the male member are rigidly and sealingly fastened to the ends of the respective pipes being connected.

Although this known pivotal pipe joint has been found to satisfy at jointing of casing pipes of small-to-medium diameters (up to 0.3 m), it does not meet in full the requirements put before joints of large-diameter casing pipes, since in this case the presence of the threaded connection of the male member with the spherical ring becomes ill-advised. This can be explained by the fact that considerable axial stresses brought about by the own weight of a large-diameter casing string, as the latter is inserted into a borehole, and the oval, however slightly, shape of the pipes in the areas of the male members may result in disconnection of the male member and the spherical ring, on account of disengagement of the threads, which means a breakdown. The operation of jointing of the pipes is relatively time-consuming (several minutes per joint), which prolongs insertion of a casing string and thus increases the possibility of crumbling in of the walls of the uncased borehole, which also means an emergency situation. Making good such emergencies consumes both time and money.

A disadvantage of the abovedescribed known joint, which is common to any threaded joint, is the necessity of having a pipe screwing-on device with torque limiting means settable to a required screwin-on torque, least the threads might be destructed by this operation. The known joint also requires particular thoroughness of alignment of the spherical ring and male member prior to screwing-on, to prevent cutting away of the threads.

Furthermore, the retaining member securing the spherical ring in the female member during assembling of the joint are to be inserted and removed, which requires either manual labor or a combination of two devices, viz. a removing one and one indexing the first one relative to the position of these retaining members in the female member, which complicates the assembling operation.

It is an object of the present invention to eliminate these disadvantages.

It is an object of the present invention to provide a pivotal pipe joint which should include means connecting the male member with the spherical ring, that should make pipe connection with the help of this joint quick, simple and reliable.

It is another object of the present invention to create a pivotal pipe joint that should be suitable for connection of pipes of both small and large diameters.

It is still another object of the present invention to create a pivotal pipe joint that should be disassembled as quickly and as simply as it is assembled.

These and other objects are attained in a pivotal pipe joint, including a spherical ring, a male coupling member mounted on one of two pipes to be jointed and received in the bore of said spherical rings coaxially therewith, the male member and the spherical ring being connected to each other, a female coupling member mounted on the other pipe and having a spherical socket accommodating said spherical ring which latter is fixed in said socket coaxially with the female member with retaining members at an early stage of assembling of this joint, and sealing means, which pivotal pipe joint, in accordance with the present invention, further includes spring-urged locking members effecting said connection of said male coupling member and said spherical ring, each locking member being received simultaneously in grooves made, respectively, in adjoining cylindrical surfaces of the spherical ring and of the male member, the grooves facing each other at the final stage of assembling of the joint, each locking member being adapted to hide in one of these grooves, as the spherical ring and the male member are moved relative to each other along their common axis during assembling of the joint.

The employment of spring-urged locking members which are received at the final stage of assembling of the joint simultaneously in the grooves, respectively, of the male member and of the spherical ring enables to connect the pipes by mere relative axial motion which can be effected quickly, simply and reliably and needs no additional devices for screwing the pipes together. These locking members also make it possible to connect pipes of a large diameter, since the herein disclised connection of the male member with the spherical ring renders errors at manufacturing and assembling of pipes non-significant.

Furthermore, these locking members enable to broaden considerably the field of applications of the herein disclosed pivotal pipe joint, since the latter may be successfully empoyled as a joint offering either three or two degrees of freedom, whichever is desirable (i.e. offering three and two relative angular displacements of the jointed pipes about two or three perpendicular axes).

The invention is further characterized in that said spherical ring has on the end face thereof facing the pipe carrying the male member a shoulder positioned below said grooves, this shoulder supporting the said sealing means clamped between the surfaces of the male member and the spherical socket of the female member. In this way a single sealing element effects two-way sealing of the female and male members.

The invention is also characterized in that the grooves of the male member form a common annular groove, each said groove of said spherical ring being in the form of a port of a rectangular shape, receiving therein the respective one of the locking members, depressable by the male member into this port, the lateral walls of the port having cut therein blind notches opening on the spherical surface of the ring, while the longitudinal walls of the port have cut therein other notches in the form of apertures also opening on the cylindrical surface of the ring.

The above structure of the grooves, respectively, of the male member and of the spherical ring provides for jointing the pipes without rotating either one of them during jointing and also provides for reducing the lateral size of the joint as such, which is essential in the case of casing pipes.

The invention is still further characterized in that each locking member is a curvilinear bar of which the side facing the male member has the radius of curvature not smaller than the radius of the bore of the spherical ring, the upper portion of this side having a chamfer cut therein, the upper and lower sides of the bar having projections receivable in the blind notches of the respective port of the ring to retain the bar in the port and to prevent its falling therefrom, the side of the bar, facing the spherical surface of the socket of the female member, having cut therein a longitudinal groove accommodating a leaf spring adapted to urge the bar, the ends of the spring being received in the notches cut in the longitudinal walls of the respective port of the spherical ring.

With the above structure of the locking member there are created prerequisites for minimizing the quantity of these locking members, with optimal use of the cross-sectional area of the spherical ring and with rational re-distribution of the tensile stresses created by the load applied to the pipes, e.g. when the latter are pulled out from a borehole.

The invention is also characterized in that the free end of the male member has an external bevel for cooperation with the chamfer of the curvilinear bar, as the latter is depressed into the port of the spherical ring, and for further contact with the spherical surface of the socket of the female member.

This external bevel of the male member assists self-alignment of the male member at the initial moment of connection of the pipes, i.e. as the male member is introduced into the bore of the spherical ring, and reduces the contact stresses resulting from transmission of compressing loads acting upon the pipes, e.g. during insertion of the pipes into the borehole.

The invention is still further characterized in that the said longitudinal groove of the bar has made therein a recess, while the leaf spring has a projection receivable in this recess in the bar, this longitudinal groove of the bar having a varying depth increasing from the centre of this groove towards the ends thereof. In this way there is ensured reliable retaining of the spring urging the curvilinear bar and reduction of the bending strain therein without increasing the diameter of the spherical ring.

With the herein disclosed structure of the pivotal pipe joint of our invention, it is advisable that the external cylindrical surface of the male member should have cut therein longitudinal open grooves communicating with the annular groove of the male member, adapted to receive therein means for depressing the curvilinear bars into the ports of the spherical ring at disassembling of the joint. This enables selective disassembling of the joint, wherever necessary, preventing at the same time self-disassembling of this joint.

The invention is still further characterized in that said grooves of the spherical ring and of the male member are in the form of recesses of rectangular shape, the said locking members being received in the recesses of the male member and being depressable thereinto by the spherical ring at relative displacement of the male member and of the spherical ring along their common axis, the spherical ring having an internal bevel, each said locking member being in the form of a curvilinear bar of which the side facing the cylindrical wall of the bore of the spherical ring has a radius of curvature which is not in excess of the radius of the external cylindrical surface of the male member, the lower portion of this side having cut therein a chamfer for cooperation with the said internal bevel of the spherical ring, as said bar is being depressed, the side of said bar, facing the bottom of the groove in the male member, having a notch cut therein across the entire height thereof, the notch receiving therein a projection of a leaf spring of which the ends abut against the bottom of the groove, thus urging the bar, the latter having longitudinal notches cut in the end faces thereof, the longitudinal walls of the groove of the male member having made therein through apertures communicating with this groove and with the cylindrical surface of the male member, adjoining the ring, pins being pressure-fit in these apertures so that the ends thereof project into the groove of the male member and are received in the said longitudinal notches, retaining the bar from falling out from the groove of the male member.

The above structure of the locking member and the positioning thereof enable to employ the herein disclosed pivotal pipe joint for transmitting a torque, as the jointed pipes are rotated, while maintaining the two degrees of freedom. It should be noted that the reliability of the connection of the male member with the spherical ring increases, as the angular speed of rotation of the jointed pipes increases, because this increased angular speed creates greater centrifugal forces developed by the locking members and additionally pressing the latter to the bottoms of the respective grooves of the spherical ring.

The invention is characterized in that the cylindrical surface of the spherical ring, adjoining the male member, has cut therein open longitudinal passages communicating with the said grooves of the spherical ring and opening in the free end face of the spherical ring, adapted to accommodate therein means for depressing the curvilinear bars into the grooves of the male member at disconnection of the pipes, the side of the curvilinear bar, facing the ring, having a locally chamfered portion above which there is positioned the respective one of said open longitudinal passages of the spherical ring, this chamfered portion being adapted to be acted upon the bar depressing means. This provides for selective disassembling of the pivotal joint.

The means for depressing the locking members for disassembling of the joint may be in the form of a sleeve mounted on the male member for motion therealong at disconnection of the pipes, the sleeve being adapted to engage the chamfers of the locking members, the end face of this sleeve, facing the locking member, being externally bevelled.

It is advisable that said sleeve should have a lug in the upper part thereof, this lug or thickened portion having made therein radial recesses receiving therein spring-urged pins retaining the sleeve against motion axially of the male mamber, until the moment when the joint is to be disassembled; the male member being provided with an annular shoulder against which this spring-urged pin of the sleeve abuts by the side surface thereof, the shoulder having a bevel in the same sense, as that of the bevel of the sleeve.

It is advisable that the end face of the sleeve, facing said locking member, should have longitudinal abutments with an internal bevel for cooperation with the bevelled portions of the locking members, as the latter are being depressed for disconnection of the pipes.

The above structure of the means for depressing the locking members considerably simplifies disassembling of the joint.

The next feature of the present invention is the spherical ring having made intermediate of the grooves thereof at least two additional ports receiving therein said retaining members fixing the spherical ring in coaxiality with the female member at the initial stage of assembling of the joint, each said retaining member being spring-urged and being depressable into the respective one of these ports, as it is acted upon by the male member, at relative displacement between the spherical ring and the male member along their common axis. This provides for fixing the spherical ring coaxially with the female member and for discontinuing this fixing action automatically at the final stage of the assembling operation.

Still another feature of the present invention is each retaining member being a pivotable double-arm lever having lugs on the ends thereof, one end of this lever being spring-urged, the lug of this end having a spherical portion adapted to be acted upon by the male member for depression of the lever, the lug of the other end being receivable in a recess made in the spherical surface of the socket of the female member for fixing the spherical ring in coaxiality with the female member at the initial stage of the assembling operation, the double-arm lever being urged by a T-shaped leaf spring of which one end abuts against the end of the lever, having the spherical portion, the other end of the spring being retained in inclined notches cut in the walls of the additional ports of the spherical ring, extending parallel to the plane of rotation of the lever.

The above structure of the retaining member and of the recess in the spherical surface of the socket of the female member provides for automatic retaining of the spherical ring coaxially with the female member, as long as the pipes are disconnected and for discontinuing this retaining of the spherical ring automatically, as soon as the male member is partly introduced into this ring.

These additional ports in the spherical rings may extend along the generatrix of the bore of this spherical ring, or else they may extend perpendicularly to this generatrix, the choice being made in correspondence with the conditions of operation of the jointed pipes, as well as with the loads to be transmitted by the pipes.

To protect the grooves with the locking members from access of dust and dirt and to increase the reliability of the performance of the joint at repeated assembling and disassembling, the additional ports of the spherical rings with the grooves in the form of recesses are partly overlapped from the side of the male member by the body of the ring, while the remaining portions of these ports adapted for passage of the bell crank of each retaining member are positioned between the end face of the ring, having the projection for the sealing means, and the grooves for the locking members, the recess in the spherical surface of the socket of the female member, adapted to receive the projection of the bell crank, being annular.

To transmit a driving torque from the spherical ring to the jointed pipes and to reduce the contact strains developed during such transmission in the elements transmitting this driving torque, it is advisable that the spherical surface of the spherical ring, adjoining the spherical surface of the socket of the female member, should have made therein two diametrally opposing grooves with flat longitudinally extending walls, each last-mentioned groove receiving therein an insert in the form of a rectangular parallele-piped having a cylindrical bore adapted to receive therein the shank portion of a screw threaded into a threaded through opening provided in the female member.

It is further advisable that the annular groove of the male member should receive therein an elastic hollow ring, passages being cut in the male member, communicating with the internal space of this elastic ring and opening into a space above the spherical ring, so that these passages can be used for supplying into this elastic ring a working fluid capable of expanding this elastic ring for the latter to act upon the locking members, this elastic ring, therefore, acting as the means for depressing the locking members into the groove of the spherical ring, when the pipes are to be disconnected.

It may be expedient that each last-mentioned passage should have a cavity made therein, receiving a charge of explosive, explosion of this charge generating a gaseous working fluid under pressure, whereas the internal space of the elastic ring, to provide an outlet to this gaseous working fluid at disassembling of the joint, communicates with ambient atmosphere through additional passages made in the male member and associated with safety and check valve means.

The last-described modifications of the means for depressing the curvilinear locking bars at disconnection of the pipes provide simultaneous depression of every curvilinear bar without any additional (i.e. external) depressing means, which speeds up the operation of disconnection of the pipes, which in this case is performed in the same way, as the assembling operation, viz. by mere relative axial motion of the male member and spherical ring along their common axis.

Therefore, in the herein disclosed pivotal pipe joint there are employed spring-urged locking members which have enabled to eliminate the disadvantages inherent in threaded connections; furthermore, the present invention broadens the field of applications of the pivotal joints, irrespectively of the diameter of the pipes, conditions of their operation and manufacturing errors.

Assembling of the herein disclosed pivotal pipe joint (and, correspondingly, disassembling thereof, whenever necessary) is performed quickly and simply, since this is effected by merely displacing axially of the two pipes being jointed relative to the other one (the disassembling operation, as it has been already described, involving an additional operation of simultaneously depressing every locking member with locking member depressing means incorporated in the pivotal joint). Furthermore, the herein disclosed locking members ensure reliable connection between the spherical ring and the male member, since the structure of the herein disclosed joint positively prevents any incidental depressing of the locking members, while the shape of the latter (as well as that of other members of the herein disclosed joint) has been selected so that these members should feature strength which is not lower than the strength of the pipes being jointed.

The present invention will be further described in connection with preferred embodiments of a pivotal pipe joint in accordance with the invention, with reference being had to the accompanying drawings, it should be noted that the expressions used in the disclosure, such as "top," "bottom," "up," "down," "vertical and horizontal planes," which are true in the case of the described joint of casing pipes, may also be used, although conditionally, for other cases and embodiments of the joint used for connection of pipes for various applications.

FIG. 1 illustrates a general view of a pivotal joint of casing pipes, offering three degrees of freedom, in accordance with the present invention, the view being partly broken away to disclose the female member and the spherical ring, the female and male members being secured by welding to the respective pipes, the grooves for the locking members being in the form of ports in the spherical ring and in the form of an annular groove in the male member;

FIG. 2 shows another embodiment of a pivotal pipe joint according to the invention, offering two degrees of freedom, the joint being illustrated as a general view partly broken away to disclose the female member, the male member and the pipes, the male and female members being secured by adhesive to the respective pipes, the grooves for the locking members in the spherical ring and in the male member being in the form of recesses.

FIG. 3 is a partly sectional view of the pivotal joint shown in FIG. 1, along the locking member;

FIG. 4 is a cross-sectional view along the sealing member;

FIG. 5 is a sectional view along line V—V in FIG. 1;

FIG. 6 is a perspective view of the pivotal joint shown in FIG. 1 without the sealing member, with one locking member and its spring illustrated;

FIG. 10 is a view similar to that shown in FIG. 9, with a different modification of mounting of the locking member in the groove of the spherical ring;

FIG. 11 is a partly sectional view along line XI—XI in FIG. 2;

FIG. 12 is a perspective view of a modification of the locking member of the pivotal joint shown in FIG. 2;

FIG. 16 is a longitudinally partly sectional view of the pivotal joint shown in FIG. 2, along the retaining member;

FIG. 17 is a partly sectional view along line XVII—XVII in FIG. 16;

FIG. 18 is a longitudinally partly sectional view of the pivotal joint shown in FIG. 2, along the torque-transmitting member;

FIG. 21 is a general view of an embodiment of the sleeves for depressing the curvilinear bars of the pivotal joint shown in FIG. 2;

FIG. 22 is a longitudinally partly sectional view of a modification of the pivotal joint shown in FIG. 2, provided with a sleeve for depressing the curvilinear bars;

FIG. 23 is a longitudinally partly sectional of a pivotal joint according to the embodiments shown either in FIG. 1 or in FIG. 2, when this joint is provided with a member for depressing the curvilinear bars, with additional sealing means and with additional ports in the spherical ring;

Figures 24, 25:
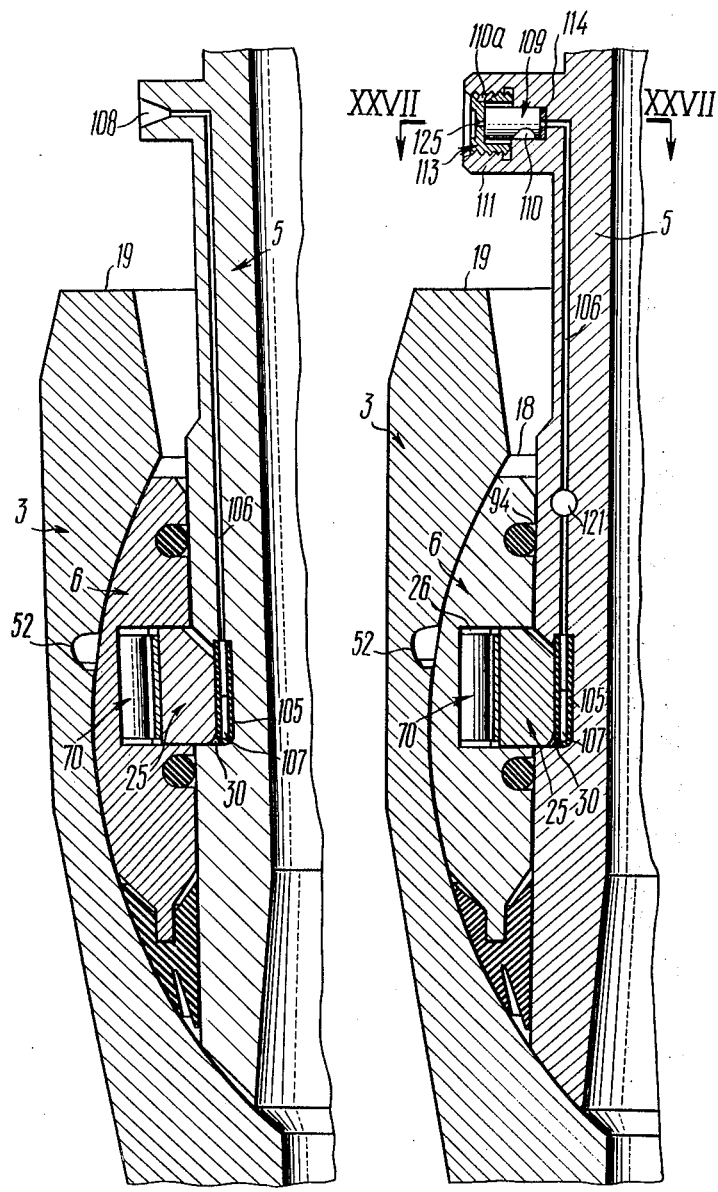
FIG. 24 is a longitudinally partly sectional view of a modification of the pivotal joint shown in FIG. 1, with a hollow elastic ring as the means for depressing the curvilinear bars at disconnection of the pipes.
Figure 33:
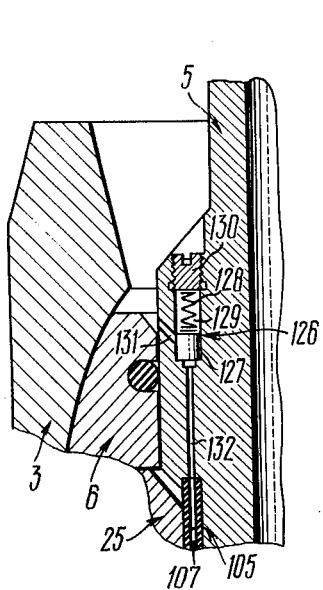
Figure 30:
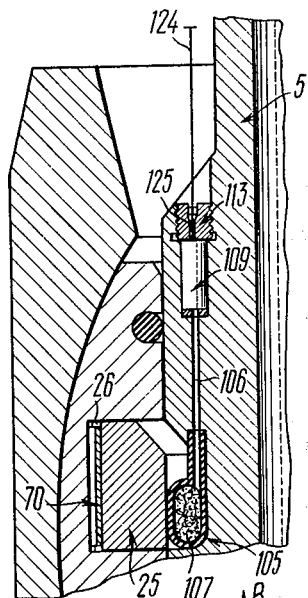
Figure 31:
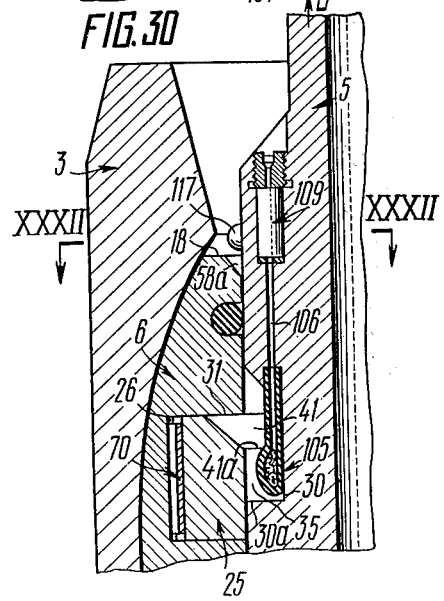

FIG. 25 shown the same, as in FIG. 24, with the source of a pressurized fluid in the form of an explosive charge accommodated in the radial cavities of the male member;

FIG. 26 shows the same, as in FIG. 25, with longitudinal arrangement of the explosive charge in the male member;

FIG. 27 is a partly sectional view along line XXVII—XXVII in FIG. 25;

FIG. 28 is a partly sectional view along line XXVIII—XXVIII in FIG. 26;

FIG. 29 is a partly sectional view along line XXIX—XXIX in FIG. 28;

FIG. 30 shows the same, as in FIG. 26, at the final stage of depression of the locking member, following expansion of the hollow elastic member;

FIG. 31 shows the same, as in FIG. 26, in the position of the hollow elastic ring, when the explosive powder gases exit through the open outlet valve upon the male member having been displaced relative to the spherical ring;

FIG. 32 is a partly sectional view along line XXXII—XXXII in FIG. 31;

FIG. 33 shows the same, as in FIG. 26 (a sectional view along the safety valve);

Referring now in particular to the appended drawings, a disconnectable pivotal joint of a pair of pipes 1 and 2 (FIGS. 1 and 2) includes a female member 3 secured on the pipe 1, the bore of the female member in the central part thereof being in the form of a spherical socket 4; a male member 5 secured on the pipe 2 by one extremity thereof; a spherical ring 6 received in the socket 4 of the female member 3.

The bore 7 of the spherical ring 6 is adapted to receive the free end of the male member 5, fixedly connectable with the spherical ring 6, the male member 5 being coaxial with the ring 6.

The ring 6 has an external spherical surface 8 mating with the spherical surface 9 of the socket 4 of the female member 3. These two surfaces 8 and 9 adjoin each other, as the spherical ring 6 is received in the socket 4 of the female member 3. The axial bore 7 of the spherical ring 6 is cylindrical, the cylindrical surface 10 (FIG. 3) thereof adjoining the external cylindrical surface 11 of the male member 5 received therein. The spherical ring 6 serves as the locking/unlocking link in the herein disclosed disconnectable joint and provides for angular displacement of the male member 5 with respect to the female member 3, the ring 6 further acting as the effort transmitting means and the basic sealing or hermetization link.

One of the end faces of the spherical ring 6 is provided with a shoulder 12 supporting thereon a sealing member 13 in the form of an X-seal (i.e. a double-channel seal) with four lips 14, two internal tapering surfaces 15 and a spherical external surface 16.

The seal 13 has a groove 12a cut in the broader side thereof intermediate of a pair of lips 14, congruent with the shoulder 12 of the spherical ring 6. The seal 13 being of the abovedescribed structure, it is adapted to receive the male member (FIG. 3) thereinside and to take upon itself gauge pressure (both external and internal) of a fluid, be it a liquid or a gas.

The spherical ring 6 is introduced into the socket 4 of the female member 3 along a pair of diametrally arranged grooves 17 (FIG. 5) cut in the spherical 9 and tapering 9a surfaces (FIG. 3) of which the latter form the upper portion of the internal bore of the female member 3 and merges with the spherical surface 9 of the socket 4 of the female member 3. Upon having been introduced into the socket 4 along the guiding grooves 17, the spherical ring 6 is turned in the socket 4 for the end face of the ring 6 with the shoulder 12 and the seal 13 supported thereby to be located within the socket 4 and to face the pipe 1 on which the female member 3 is secured. The other, free end face 18 of the spherical ring 6 is thus positioned somewhat below the upper end face 19 of the female member 3 and below the line 9b along which the tapering surface 9a merges with the spherical surface 9 of the socket 4, for the seal 13 to be compressed upon connection of the pipes between the surfaces 9 and 11, respectively, of the socket 4 and male member 5.

The guiding grooves 17 (FIGS. 1, 2 and 5) have a width which is not less than the height or axial extent of the spherical ring 6 together with the seal 13 carried thereby, the grooves being defined by a cylindrical surface 17a having a diameter equal to the maximal diameter of the spherical socket 4 of the female member 3.

After the spherical ring 6 has been introduced and turned in the socket 4, it is positioned therein coaxially with the female member 3 and retained with retaining members 20 (FIG. 1).

The female member 3 serves as a connecting link between the pipe 1 and the spherical ring 6 and ensures sealing engagement with the seal 13. The lower portion of the bore of the female member 3 is defined by a cylindrical surface 9c merging with the spherical surface 9 thereabove, the diameter of this portion of the bore of the female member 3 being equal to the diameter of the internal passage of the pipe 1. The external surface of the female member 3 (FIG. 1) includes a tapering portion 21 merging with a cylindrical portion 22 via a radial surface 22a which latter is engaged by the tools handling the female member 3 with the pipe 1 at lowering and lifting of the latter in a borehole casing operation.

The female member 3 may be secured on the pipe 1 in any known manner suitable for the purpose, depending on the material of the pipes, e.g. by welding as is shown in FIG. 1, or else by binding with an adhesive composition, as is the case illustrated in FIG. 2. In this latter case the female member 3 and the pipe 1 should be provided, respectively, with external and internal complementary tapering surfaces 23.

The male member 5 acts as a connecting link between the pipe 2 and the spherical ring 6. The male member 5 has one end or extremity thereof either welded to this pipe 2, as is shown in FIG. 1, or else adhesive-bound thereto, as is the case illustrated in FIG. 2, in which latter case the pipe 2 and the male member 5 are jointed along complementary tapering surfaces 24 provided, respectively, interiorly of the male member 5 and exteriorly of the pipe 2. Alternatively, the male member 5 may be made integral with the pipe 2.

The component parts of the herein disclosed joint, viz. the female member 3, the male member 5, the spherical ring 6 can be made, as well as the pipes 1 and 2 of any suitable material, either thermoplastic or thermosetting (e.g. of steel, fibre-glass, a light alloy, e.g. aluminium-based alloy); alternatively, some of the parts may be made of one material and others of a different material. To render metal parts corrosion-proof, their adjoining surfaces may be coated with an anticorrosion composition, e.g. with an epoxy resin compound. Alternatively, this corrosion-resistant coating may be fluoroplastic one. The seal can be made of rubber or any other elastomeric material possessing the necessary chemical, thermal and radiation resistance, to fit the operation conditions-to-be.

Connection of the male member 5 and the spherical ring 6 is effected with spring-urged locking members 25 (FIG. 1). Each of the locking members 25 is received in the assembled state of the joint simultaneously in the grooves 26 and 27 (FIG. 3) facing each other at the final stage of assembling of the joint. The grooves 26 are made in the spherical ring 6 and open in the cylindrical surface 10 of this spherical ring 6, while the grooves 27 are made in the male member 5 and open in the external cylindrical surface 11 thereof.

Furthermore, each locking member 25 is adapted to be depressed into one of the grooves 26 and 27 upon relative displacement of the spherical ring 6 and the male member 5 along their common axis during connection of the pipes 1 and 2.

The free end 28 of the male member 5 is provided with an external bevel or chamfer 29 adapted to engage the spherical surface 9 of the socket 4 of the female member 3 and to cooperate with the locking member 25, as the latter is depressed either into the grooves 26 of the spherical ring 6 or into the grooves 27 of the male member 5.

The bevel 29 may be tapered or spherical, the length of the male member 5 between the edge of the groove 27 to this bevel 29 being selected so that in the assembled state of the joint the male member 5 should have its bevel 29 abutting against the surface 9 of the socket 4 and that the edges of the groove 27 should coincide with those of the groove 26 of the spherical ring 6. In this way there is insured automatic positioning of the locking members 25 simultaneously in the grooves 26 and 27, as the male member 5 is introduced into the bore 7 of the spherical ring 6 until it abuts thereagainst; furthermore, this prevents appearance of considerable pulsing dynamic loads acting upon the elements of the connection.

Depending on the future application of the pipes, the locking members 25 may be mounted either in the grooves 26 of the spherical ring for subsequent depression into these grooves under the action of the male member 5, or else they may be mounted in the grooves 27 of the male member, for subsequent depression into these grooves by the spherical ring 6, as the male member and the ring are displaced axially in relation to each other, e.g. with the pipe 1, female member 3 and spherical ring 6 held stationary, while the pipe 2 with the male member 5 is displaced. This direction of the displacement of the male member 5 is indicated in FIG. 3 with arrow line A, although it does not matter at all whether, in order to lock the herein disclosed pivotal pipe joint, the male member 5 is inserted into the bore 7 of the spherical ring 6, or the ring 6 is moved onto the male member 5 by displacement of the pipe 1 with the female member 3 and the spherical ring 6.

Figures 7, 8:
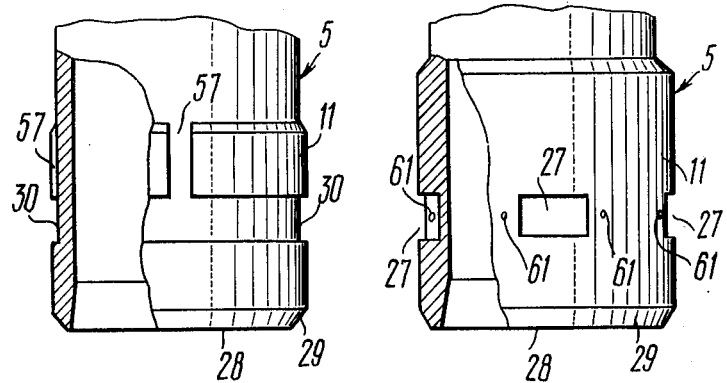
FIG. 7 is a partly sectional view of the male member of the pivotal joint shown in FIG. 2.
FIG. 8 is a partly sectional view of the male member of the pivotal joint shown in FIG. 1.
Figure 9:
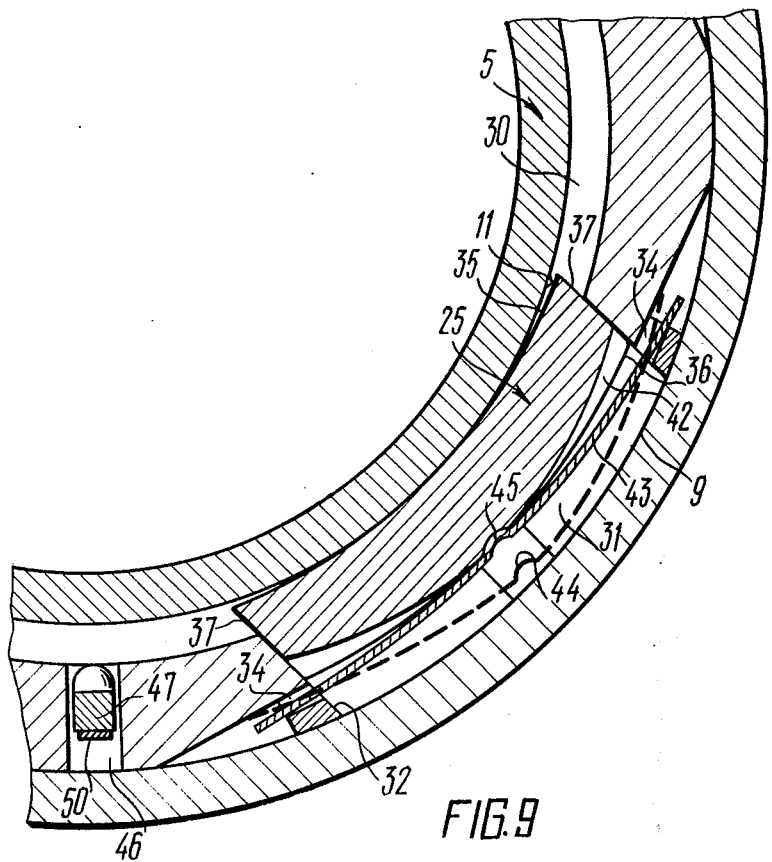
FIG. 9 is a partly sectional view along line IX—IX in FIG. 1.

The grooves 26 of the spherical ring 6 may be made as rectangular recesses (FIG. 10), or else they may be made in the form of ports (FIG. 6) also rectangular in shape. The grooves 27 of the male member 5 may be made as rectangular recesses, as shown in FIG. 7, or else they may be in the form of a single common annular groove 30 (FIG. 8). The grooves - ports 26 (FIG. 6) have their opposite transverse walls 31 and longitudinal walls 32 (relative to the common axis 0 — 0 of the pipes 1 and 2) parallel to each other. The transverse walls 31 of the port 26 have cut therein blind notches 33 opening onto the spherical surface 8 of the ring 6. The longitudinal walls 32 of the ports 26 also have notches cut therein, but in the form of through rectangular openings 34 opening onto the spherical surface 8 of the ring 6.

Each one of these grooves - ports 26 receives therein a locking member 25 in the form of a flat curvilinear bar, as is shown in FIGS. 9, 10, 11, 12. The locking member - the curvilinear bar 25 has cylindrical sides 35 and 36 (FIG. 9) facing, respectively, the surface 11 of the male member 5 and the spherical surface 9 of the socket 4, and end faces 37 parallel to the plane of symmetry of the bar. The bottom and top flat sides, respectively, 38 and 39 (FIG. 3) of this curvilinear bar have made thereon limiting abutments 40 receivable in the blind notches 33 of the ports 26 of the spherical ring 6, to retain the bar in the respective port against falling out therefrom into the bore 7 of the spherical ring 6.

The cylindrical side 35 of the bar has a radius of curvature which is not less than the radius of the cylindrical bore 7 of the spherical ring 6, the top part of this side, adjoining the flat top surface 39, having made therein a chamfer or bevel 41 inclined in the direction of the insertion of the male member 5 into the spherical ring 6.

The cylindrical side 36 of the bar has cut therein a longitudinal groove 42 (FIG. 9) receiving therein a flat leaf spring 43 biasing this bar and retaining it in the annular groove 30 of the male member 5. The central portion of the leaf spring 43 has a projection 44; this projection may be formed by bending the spring 43 in a manner shown in FIG. 9. The ends of the spring 43 are received in the through openings 34 in the longitudinal walls 32 of the groove - port 26, through which opening the springs 43 are introduced, as the locking members 25 are mounted at manufacture of the joint; alternatively, either both openings 34 or either of them may be blind (not shown in the appended drawings) and simply adapted to receive therein the ends of the respective spring 43, introduced from the port - groove 26.

The longitudinal groove 42 of the bar has varying depth, the depth increasing from the centre of the bar toward the ends thereof, the central portion of the groove having cut therein a recess 45 receiving therein the projection 44 of the spring 43, so that the spring 43 is reliably retained on the bar.

The abovespecified structure of the locking member 25 enables to reduce the overall lateral dimensions of the joint. The quantity of the locking members 25 and of the grooves 26 in the spherical ring 6 depends on the diameter of the connected pipes 1 and 2 and is not less than 2, e.g. 4.

To retain the spherical ring 6 in the socket 4 of the female member 3 coaxially therewith at the initial stage of assembling of the joint, the spherical ring has cut therein additional ports 46 (FIG. 6) receiving each a retaining member 20 adapted to establish rigid connection between the ring 6 and the female member 3. A pair of such ports 46 is sufficient to retain reliably the ring 6 coaxially with the socket 4, the two ports being arranged in diametral opposition, intermediate of the grooves 26 of the spherical ring 6 with the locking members 25. The additional ports 46 are elongated along the generatrix of the surface 10 of the internal bore 7 of the spherical ring 6, i.e. they extend axially of the male member 5. This shape of each port 46 and its axial orientation ensure that the cross-sectional area of the spherical ring 6 is weakened but slightly by these ports 46, which is essential for the capacity of the ring to transmit tensile efforts.

Each retaining member 20 is a spring-biased double-arm lever 47 (FIG. 13 and 14) rotatable in a longitudinal plane, the extremities of the two arms being provided with oppositely directed lugs 48 and 49, respectively. These double-arm levels 47 are received in the ports 46 (FIG. 13) and are adapted to be depressed into these ports, as they are acted upon by the male member 5 moving relative to the ring 6 during assembling of the joint. This is attained by the double-arm lever 47 being slightly inclined in the respective port 46 so that one extremity thereof projects from this port 46 into the bore 7 of the spherical ring 6, i.e. it is in the path of the male member 5.

Retaining of the lever 47 in this inclined position (shown by a dotted line in FIG. 13) is effected by a T-shaped leaf spring 50 acting upon the lower extremity of the lever. The lug 48 of this extremity projects into the bore 7 of the spherical ring 6, this lug 48 including a spherical portion 51 positioned to be acted upon by the bevel 29 of the male member 5, in which way the lever 47 is depressed into the port 46. At the level of the positioning of the lug 49 on the other extremity of the lever 47 there is made in the spherical surface 9 of the socket 4 of the female member 3 a recess 52 adapted to receive therein this lug 49 on the extremity of the lever 47, in which way the spherical ring 6 is retained coaxially with the female member 3.

To provide for pivoting of the double-arm lever 47, the latter has in the central portion thereof at both sides two opposing cylindrical projections 53 (FIG. 14) adapted to be received in blind grooves 54 (FIGS. 6 and 13) cut in the longitudinal walls of the respective ports 46, parallel to the plane of pivoting of the lever 47. The grooves 54 are communicated with the spherical surface of the spherical ring 6, in which way the lugs 53 of the lever 47 (FIG. 13) are introduced thereinto, as the latter is mounted in the respective port 46.

The T-shaped leaf spring 50 has one end thereof, as it has been already mentioned, abutting against the lower extremity of the double-arm lever 47, the opposite end of this spring being secured, e.g. by adhesive, in an inclined groove 56 cut in the longitudinal wall 55 of the port 46. As the retaining member 20 is being mounted, the double-arm lever 47 is positioned in the respective port 46, the projections 53 thereof being introduced through the grooves 54. Thereafter the T-shaped leaf spring 50 is introduced through the grooves 56, and the respective end of the spring is fixed in these grooves, whereby the spring "locks" the lever in the port 46, preventing the projections 53 of the lever 47 leaving the grooves 54.

In cases when the operating conditions of the herein disclosed pipe joint call for the joint to be disconnectable, it is expedient that the external cylindrical surface 11 of the male member 5 should have cut therein longitudinal open passages 57 (FIGS. 3 and 8) of which the quantity should be equal to that of the locking members 25. These open passages 57 should communicate with the annular groove 30 of the male member 5. These passages 57 are used to have introduced therethrough such means as thin bars, pins and like elongated members, by means of which the locking members 25 may be depressed into the respective grooves-ports 26 of the spherical ring 6, whereafter the pipe 2 with the male member 5 thereon may be pulled out from the bore 7 of the spherical ring 6.

Thus, pivotal connection of the pipes 1 and 2 is effected in two steps, viz. a factory step (pre-assembling) and a field step (final connection of the casing pipes). At pre-assembling at the manufacturing factory of the male member 5 and the female member 3 are secured to the ends of the respective casing pipes 2 and 1. The locking members 25, i.e. the curvilinear bars are introduced into the grooves - ports (FIG. 9) of the spherical ring 6 from its spherical surface 8, so that the projections 40 of these bars are received in the blind notches 33 of these grooves-ports 26. Then the spring 43 is introduced through the through openings 34 and is received in the longitudinal groove 42, the projection 44 thereof being received in the recess 45 of the bar, so that the spring is reliably retained. Now, the action of the spring 43 makes the bar, i.e. the locking member 25 project partly from the groove - port 26 of the spherical ring 6 into the bore 7 thereof. The degree of projection of the bar into the bore 7 of the spherical ring 6 is limited by the appropriately chosen length of the blind notches 33 (FIG. 3).

The seal 13 is put onto the shoulder 12 of the spherical ring 6, pre-coated with glue; this glueing-up, however, is optional and may be called for by the rigidity of the material of the seal and by the operation conditions-to-be.

The additional ports 46 of the spherical ring have mounted therein, as it has been already described, the double-arm levers 47, whereas the T-shaped leaf springs 50 are mounted in the grooves 56, these springs biasing the respective double-arm levers 47, retaining them in the ports 46 so that the lugs 48 of their lower extremeties project into the bore 7 of the spherical ring 6. The spherical ring 6, now assembled with the locking members 25, the retaining members 20 and the seal 13, is inserted through the grooves 17 of the female member 3 (the position of the ring during insertion is shown by dotted lines in FIG. 5) as far as it still go, whereafter the ring is rotated first bodily through 90° in a direction ensuring that the seal 13 faces the pipe 1 supporting the female member 3 (FIG. 3), and then in the diametral plane of the ring till the retaining members 20 snap in, i.e. till the T-shaped leaf springs 50 send the lugs 48 of the double-arm levers 47 into the bore 7 of the spherical ring 6 and the lugs 49 into the recesses 52 of the female member 3. This position of the levers 47 is shown by a dotted line in FIG. 13.

Final assembling (under field conditions) is positively minimized, viz. first, the lower casing pipe 1 is retained in any known way at the mouth of the borehole with the female member 3 facing upwardly, the latter having the spherical ring 6 retained in the socket 4 thereof, as it has been described hereinabove, and then any appropriate handling means is used to lower the pipe 2 with the male member 5 facing downwardly into the bore 7, until the end face 28 thereof has its bevel 29 abutting against the socket 4 of the female member 3. As the male member 5 advances through the bore 7 of the spherical ring 6 by gravity of the pipe 2, the bevel 29 of the male member 5 depresses the spring-biased locking members 25 by acting upon the bevels 41 of these members, and the latter hide in the grooves - ports 26 of the spherical ring 6 and are held therein by the external surface 11 of the male member 5, the spring 43 attaining a position shown by a dotted line in FIG. 9. Then the bevel 29 (FIG. 13) of the male member 5 bears upon the spherical portions 51 of the lugs 48 of the double-arm levers 47, pivoting these levers and withdrawing the lugs 49 from the recesses 52 of the female member 3. As the end face 28 of the male member 5 abuts against the spherical surface 9 of the socket 4 of the female member 3, the edges of the annular groove 30 (i.e. of the groove 27, speaking generally) of the male member 5 align with the edges of the groove - port 26 of the spherical ring 6, and the locking members - bars 25 are urged by the spring 43 into this annular groove 30 of the male member, reliably locking the male member 5 in the spherical ring 6 against axial displacement. Now the double-arm levers 47 are retained hidden within the ports 46, since their lugs 48 abut against the external surface 11 of the male member 5, which enables rotation of the spherical ring 6 jointly with the male member 5 and the pipe 2 in the socket 4 of the female member 3. Furthermore, the grooves 27 of the male member being in the form of a common annular groove 30, the assembling of the joint does not require additional turning of the male member 5 in the bore 7 of the spherical ring 6.

The abovedescribed structure of the herein disclosed pivotal joint offers three degrees of freedom of movement of the jointed pipes, i.e. three directions of relative angular displacement of the pipes about any three perpendicular axes intersecting at the central point of the spherical socket 4 of the female member 3.

Disassembling of the joint, i.e. disconnection of the pipes is effected in a reverse order, viz. the bevels 41 of the curvilinear bars are simultaneously depressed with rods (not shown in the drawings) introduced through the passages 57 of the male member 5, to hide the bars in the ports 26 of the spherical ring 6, whereafter the male member 5 jointly with the pipe 2 is pulled out from the ring 6 beyond the female member 3 of the pipe 1.

Thus, the herein disclosed pivotal joint provides for simplified operation of jointing of casing pipes, for cutting the time required for this operation and to introduce easily automation into the process of assembling of casing pipes under field conditions, since the locking and retaining members are controlled by the male member itself, as the male member and the spherical ring are displaced axially relative to each other.

Depending on the actual application of the jointed pipes, e.g. in case of using the pipes for torque transmission at angular displacement of the pipes, which is the case requiring but 2° of freedom from the pivotal pipe joint (FIG. 2), it might be expedient that the locking members 25 should be mounted in the grooves 27 (FIGS. 7, 11 and 15) of the male member 5 and be depressable thereinto by the spherical ring 6, as the male member 5 is introduced into this ring 6. In this case, to provide for better interception between the spherical ring 6 and the locking members 25, as the latter are being depressed, the spherical ring 6 preferably has an internal bevel or chamfer 58 cut therein.

Figures 13, 14, 15:
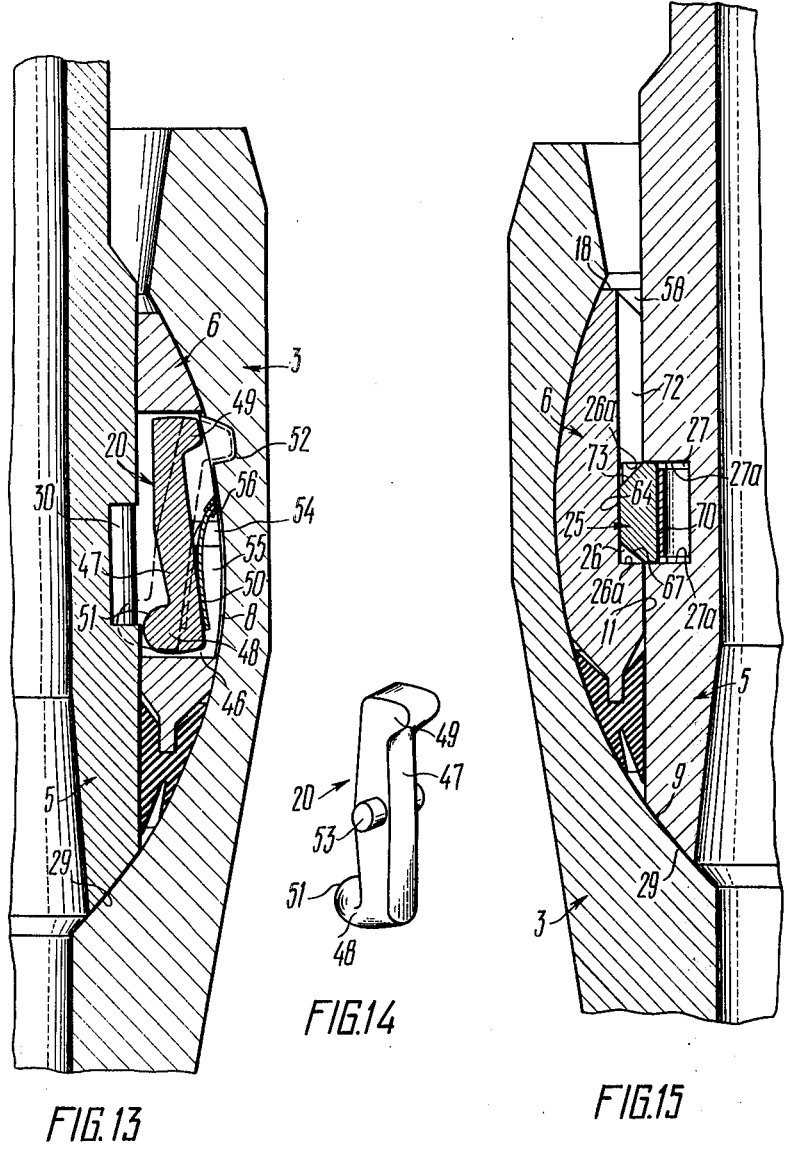
FIG. 13 is a longitudinally partly sectional view of the pivotal joint shown in FIG. 1, along a retaining member.
FIG. 14 is a perspective view of the retaining member.
FIG. 15 is a longitudinally partly sectional view of the pivotal joint shown in FIG. 2, along the locking member.

The grooves 27 of the male member 5 and the grooves 26 of the spherical ring 6, adapted to accommodate therein the locking members 25, are in the form of rectangular recesses, i.e. recesses having parallel longitudinal walls 59 and 59a (FIG. 11), respectively, cylindrical bottoms 60 and 60a and parallel top and bottom walls 27a and 26a (FIG. 15). The longitudinal walls 59 of the groove 27 in the male member 5 have cut therein tapering through apertures 61 opening into the groove 27 and onto the external surface 11 of the male member 5, adjoining the cylindrical surface 10 of the internal bore 7 of the spherical ring 6. The tapering apertures 61 have pressure-fit therein conical pins 62, each pin 62 being fit in the respective aperture 61 so that an extremity 63 thereof projects into the groove 27.

Each locking member 25 in the presently described embodiment, like in the embodiment described hereinabove, is in the form of a flat curvilinear bar with cylindrical sides 64 and 65 facing, respectively, the bottom 60a of the groove 26 in the spherical ring 6 and the bottom 60 of the groove 27 in the male member and with end faces 66 parallel with the central plane of the bar and with the longitudinal sides 59 and 59a of the grooves 27 and 26, respectively. The cylindrical side 64 facing the cylindrical surface 10 of the bore 7 of the spherical ring 6 has a radius of curvature which is not in excess of the radius of curvature of the external surface 11 of the male member 5, adjoining the spherical ring 6. The botttom portion of this side 64 (FIGS. 12 and 15) has a bevel 67 of which the inclination corresponds to that of the internal bevel 58 of the spherical ring 6, this bevel 67 being adapted to be acted upon by the bevel 58, as the curvilinear bar is depressed into the groove 27 of the male member 5 at the initial stage of assembling of the joint. The cylindrical side 65 (FIG. 12) of the bar, facing the bottom 60 of the groove 27, has a slot 68 extending over the entire height thereof, while the end faces 66 have cut therein longitudinal open grooves 69. As the bar - the locking member 25 is mounted in the groove 27 of the male member 5 (FIG. 11), the projecting extremeties 63 of the pins 62 are received in the longitudinal grooves 69 of the bars and thus hold the latter from falling out from the respective grooves 27 of the male member 5.

Spring-biasing of the bars - locking members 25 is effected by a bent leaf spring 70 having a projection 71 in the central portion thereof. The bent ends of this spring 70 abut against the bottom 60 of the groove 27, biasing the bar. As the bars are depressed into the respective grooves 27, the projections 71 of the leaf springs 70 enter the slots 68 of the bars, the length of the leaf springs 70 being less than the length of the curvilinear bars. A position occupied by the spring 70 after the locking member 25 has been depressed into the groove 27 of the male member 5 is shown by a dotted line in FIG. 11.

Spring-boasing and retaining of the locking members - bars 25 may be also effected in a similar way in cases when the locking members are mounted in the grooves 26 of the spherical ring (as is shown in FIG. 10), when the grooves 27 of the male member are in the form of a single annular groove 30. In such cases the tapering through apertures 61 are cut in the spherical ring 6 and open into the groove 26 of the spherical ring and onto the spherical surface 8 thereof.

When the pivotally jointed pipes 1 and 2 are to be disconnectable, the cylindrical surface 11 of the spherical ring 6 has cut therein open passages 72 (FIG. 15) opening onto the free end face 18 of the spherical ring 6 and communicating with the grooves 26 of this ring.

Corresponding means may be introduced through these passages 72, such as rods, pins, etc. to act upon the bars and depress them into the grooves 27 of the male member 5 to disconnect the pipes. To facilitate interaction between the depressing means and the bars, each one of the latter has a locally bevelled portion 73 (FIGS. 12 and 15) cut in the side 64 thereof, facing the bottom 60a of the groove 26 of the spherical ring 6, this portion 73 being positioned to face the open passages 72 and being inclined in a sense opposite to that of the inclination of the bevel 67. Connection of the pipes with the presently described arrangement of the locking members 25 is performed in the same manner which has been already described hereinabove, the only difference being that here, as the male member 5 is introduced into the bore 7 of the spherical ring 6, the curvilinear bars are depressed into the grooves 27 of the male member 5 by being acted upon by the internal bevel 58 of the spherical ring 6 engaging the bevels 67 of the respective bars; as soon as the male member 5 has its bevel 29 abutting against the surface 9 of the socket 4 of the female member 3, the male member 5 is turned about its longitudinal axis until the grooves 26 and 27 coincide. Then the curvilinear bars 25 are partly projected from the grooves 27 of the male member 5 under the bias of the spring 70 and enter the respective grooves 26 of the spherical ring 6, positively retaining the male member and the spherical ring against relative axial displacement and preventing rotation of the male member relative to the spherical ring. It should be noted that the stage of the assembling operation consisting of turning of the male member about the longitudinal axis thereof may be effected by operation-wise rotation of the jointed pipes.

In the presently described embodiment of the pivotal pipe joint with 2° of freedom retaining of the spherical ring 6 coaxially with the female member 3 is effected with the help of additional ports 46a receiving therein the retaining members 20, the ports 46a being similar to the abovedescribed ports 46 but being arranged perpendicularly to the generatrix of the bore 7 of the spherical ring 6 (FIGS. 16 and 17).

The retaining members 20 are in the form of double-arm levers 47a similar to the double-arm levers 47 of the previous embodiment (FIG. 13). The levers 47a are mounted for pivoting in a lateral plane, the lugs 53a (FIG. 16) thereof being receivable in grooves 54a made in the top and bottom lateral walls of the ports 46a. Spring-biasing and locking of the lever 47a is effected by a T-shaped leaf spring 50a similar to the abovedescribed spring 50, the spherical surface 9 of the socket 4 having made therein a recess 52a (FIG. 17) which is entered by the lug 49a of the lever 47a, when the male member is not introduced into the spherical ring 6. The lug 48a has a spherical portion 51a adapted to be acted upon by the bevel 29 of the male member 5, as the latter is advanced in the spherical ring 6, whereby the lever 47a is pivoted in the lateral plane and hides within the port 46a.

To have a driving torque transmitted from the female member 3 to the spherical ring 6 and vice versa, the latter has made in the spherical surface 8 thereof, adjoining the spherical surface 9 of the socket 4 of the female member 3, a pair of diametrally arranged grooves 74 (FIG. 18) with longitudinal planar walls 74a, while the female member 3 has made therein a through threaded opening 75.

A screw 76 is threaded into each opening 75, having a cylindrical tail portion which is received in the cylindrical aperture 77a of an insert 77b accommodated in the respective groove 74 of the spherical ring 6.

The insert 77b is shaped as a rectangular parallelepiped and is made of an antifriction material. The provision of this insert reduces the value of contact strain at the members participating in torque transmission, i.e. at the head 77 of the screw 76 and at the wall 74a of the groove 74.

The screw 76 has an annular shoulder 78 accommodated in a counterbore 79 of the aperture 75, which limits displacement of the screw 76 into the female member 3 and ensures that the tail portion 77 is spaced by a predetermined gap from the spherical surface 9 of the socket 4 of the female member 3, which positively prevents jamming of the spherical ring 6 in the socket 4 of the female member 3 on account of this screw. Self-loosening of the screws 76 is prevented by glueing up the respective shoulder 78 of each one of them to the surface of the counterbore 79 of the respective opening 75.

The means for depressing the locking members 25 into the grooves 26 of the spherical ring 6 at disconnection of the pipes may be permanently accommodated in the open passages 57 of the male member 5. In this case this means is in the form of a sleeve 80 (FIG. 19) received about the male member 5 for displacement axially thereof. This sleeve has the end face thereof, facing the locking member 25, an external bevel 81 for interaction with the bevel 41 of the locking member 25 at depression of the latter.

This bevel 81 upon connection of the pipes 1 and 2 acts as the topmost lateral wall of the groove 27 of the male member 5, in case the groove 27 and the passages 57 of the male member 5 are in the form of a single common annular groove.

To depress the locking members 25 by the sleeve 80 it is sufficient to depress the free end 82 thereof by any suitable known means. To prevent displacement of the sleeve 80 along the male member 5 beyond the spherical ring 6, the male member 5 is provided with an abutment 83a in the form of a screw threaded into a threaded opening 83a provided in the male member 5. This abutment 83 is received in a longitudinal groove 84 made in the sleeve 80 adjacent to its end face 82, which enables to displace the sleeve 80 along the male member 5 by depression of the end face 82, to depress the locking members 25 into the grooves 26 of the spherical ring 6 by means of this sleeve.

It is practical to incorporate such sleeves when the operating conditions call for frequent disassembling and assembling of the joint, and only in the cases where the locking members 25 are mounted in the grooves 26 of the spherical ring 6. To provide for mounting the sleeve 80 onto the male member 5, e.g. when the latter is made internal with the pipe 2, the sleeve 80 should be split in advance into equal halves which are secured together with adhesive at assembling.

The actual structure of the sleeves 80 may vary, to correspond, firstly, to the operating conditions of the jointed pipes.

Thus, the sleeve 80 (FIG. 20) may have a lug 85 in the upper portion thereof, in which there are cut two diametrally arranged radial recesses 86, each of them receiving therein a rod 87 biased with a compression spring 87a.

The side surface of the rod 87 bears against an annular shoulder 88 made on the female member 5.

With this arrangement of the rods 87 the sleeve 80 is retained on the male member 5 against displacement axially thereof. The bore 89 of the sleeve 80 in the area of the radial recesses 86 has a diameter which is greater than the diameter of the annual shoulder 88 on the male member 5. To provide for automatic positioning of the sleeve 80 at assembling of the joint, the shoulder 88 has a bevel 90 of which the sense of inclination is similar to that of the bevel 29 on the male member 5, the internal surface 89 of the sleeve 80 being provided with a bevelled portion 91 adapted to adjoin the bevel 90 of the shoulder 88 at assembling of the joint.

Figures 19, 20:
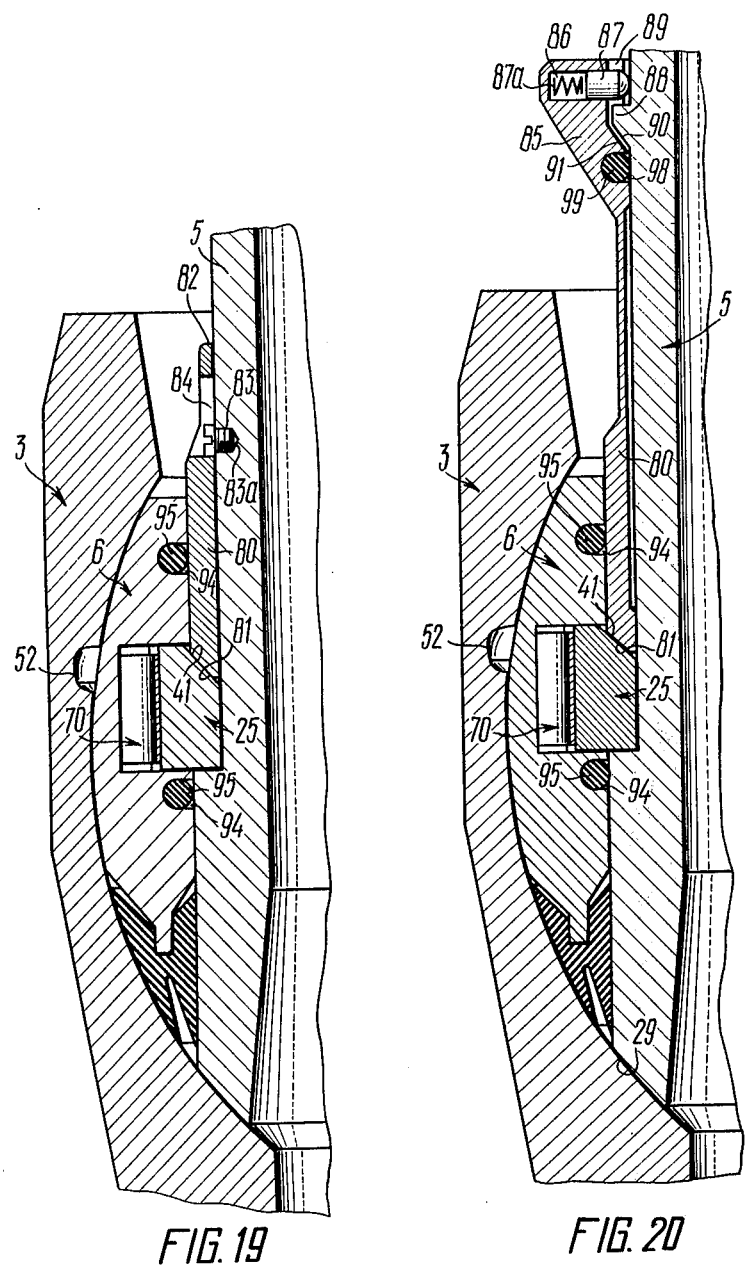
FIG. 19 is a longitudinally partly sectional view of the pivotal joint shown in FIG. 1, with the member for depressing the curvilinear bars at disassembling of the joint and a modification of the spherical ring with the grooves in the form of recesses.
FIG. 20 shows the same, as in FIG. 19, with a different modification of the means for depressing the curvilinear bars at disassembling of the joint.

In the cases where the locking members 25 are mounted in the grooves 27 of the male member 5 (FIG. 11), the upper portion of the sleeve 80 may have a structure which have been described hereinabove and illustrated either in FIG. 19 or in FIG. 20, while the bottom portion of the sleeve is the form of a plurality of elongated projections 92 (FIG. 21). These projections 92 are received in the longitudinal open passages 72 (FIG. 22) made in the spherical ring 6, to act upon the bevelled portions 73 of the bars to depress the latter. To provide for more reliable interaction with the locking members 25, each projection 92 of the sleeve has an internal bevel 93 acting in the assembled state of the joint as the upper wall of the groove 27 in the male member 5.

To prevent axess of dirt and dust to the grooves 26 and 27, respectively, of the spherical ring 6 and of the male member 5, accommodating the locking members 25, the cylindrical surface 10 of the spherical ring 6 has cut therein above and below the grooves 26 a pair of annular grooves 94 (FIGS. 19 and 20) receiving therein sealing elements 95. Furthermore, an annular groove 96 (FIG. 22) receiving a sealing element 97 is preferably cut in the external surface of the sleeve 80. In the upper portion of the sleeve 80 (FIG. 22) and in its enlarged portion or lug 85 (FIG. 20) there is also cut a annular groove 98 receiving therein a sealing element 99.

In the embodiment of the herein disclosed pivotal joint, offering 2° of freedom (FIG. 22), the sleeve 80 is associated with a screw 100 retaining the sleeve 80 against rotation about the male member 5. The screw 100 is threaded into a threaded opening 101 provided in the sleeve 80, the tail portion 100a of the screw projecting into a longitudinal slot 102 cut in the external surface 11a of the male member 5, the slot having a length providing for axial displacement of the sleeve 80 at assembling and disassembling of the joint. In this case the bevel 58 in the spherical ring 6 is offset into the ring, the cylindrical surface 10a extending intermediate of this bevel 58 and the end face 18 of the spherical ring 3 and being engaged in operation by the sealing element 97 of the sleeve 80.

In embodiments wherein the means depressing the locking members 25 either into the grooves 27 of the male member 5 or into the grooves 26 of the spherical ring 6 includes sleeves 80 and sealing elements 95 the additional ports 46 accommodating the retaining members 20 are arranged exclusively along the generatrix of the cylindrical surface 10 of the bore 7 in the spherical ring 6, and these additional ports 46 should be partly overlapped by the body of this spherical ring 6, i.e. by a portion 103 (FIG. 23) thereof, a portion 104 of the port 46, through which the lug 48 of the double-arm lever 47 extends into the bore 7 of the spherical ring 6 being situated between the end face of the spherical ring 6 with the projection 12 and the grooves 26. In embodiments offering three degrees of freedom the recess 52 in the spherical surface 9 of the socket 4 of the female member 3 is in the form of an annular transverse groove, which provides for repeated assembling-/disassembling cycles without any additional indexing of the spherical ring 6 that might have been rotated about the longitudinal axis during a disassembling stage.

Alternatively, the means effecting depression of the locking members - the curvilinear bars includes a working fluid and a hollow elastic annulus or ring 105 (FIG. 24) accommodated in the annular groove 30 of the male member 5 and being of an oblong shape, as can be seen in FIG. 24, the male member 5 having in this case cut therein a passage 106 communicating with the internal space 107 of this elastic ring 105 and having an inlet communicating with the space above the spherical ring, through which the working fluid (either a liquid or a gas) can be charged into the elastic ring.

With the working fluid being thus charged into the ring 105, the latter expands and acts upon the locking members 25, depressing them into the grooves 26 of the spherical ring 6 for disconnection of the pipes.

The working fluid under pressure is fed into the passage 106 and into the internal space of the elastic ring 105 through the inlet opening 108, as it has been described hereinabove, from any suitable external source; alternatively, the pressurized working fluid may be supplied by a charge of explosive 109 (FIG. 25) including a percussive primer of any of numerous known kinds, or else a remotely-controlled electrically activated explosive charge.

When the explosive charge 109 is used as the source of the pressurized working fluid in a gaseous form, the male member 5 is provided at the inlet of the passage 106 with a radial space 110 made within a lug 111 of the male member 5 above the female member 3. This space 110 receives therein the explosive charge 109. Alternatively, the space 110 for accommodation of the explosive charge 109 may be made in a projecting part 112 of the male member 5 (FIG. 26).

For repeated disconnection of the pipes without the necessity of placing a new explosive charge 109 into the space 110 each time the previous explosive charge has been exploded, the lug 111 of the male member (FIG. 27), as well as the part 112 of this male member 5 (FIG. 28) may have made therein several such spaces 110 with an explosive charge 109 placed into each one of them, each such space communicating via a passage 106 with the internal space 107 of the elastic ring 105.

Each explosive charge 109 is retained in the respective space 110 with a screw element 113 (FIGS. 25 to 27) threaded in to project into the space 110 acccommodating the respective explosive charge 109, the inlet portion of this space 110 being provided with a helical thread 110a and sealed with an annular gasket 114.

To provide exhaust for the explosion-originated gases during disconnection of the pipes, the male member 5 is provided with an exhaust valve 115 of a plunger type. The valve includes a cylindrical rod 115a (FIG. 28) biased by a compression spring 116 engaging on of the ends of this rod. The free end 117 of this rod 115a is spherical.

The rod 115a has a reduced-diameter portion 118 intermediate of its ends, receiving therein the cylindrical surface of a screw 119 (FIG. 29) threaded into an internally threaded opening 120 made in the male member 5. The rod 115a (FIG. 28) and the spring 116 are located in a cylindrical recess 121 cut in that part of the male member 5 which at the assembled state of the joint is positioned intermediate of the end face 18 of the spherical ring 6 and the groove 94 therein. In embodiments where the explosive charges are arranged as illustrated in FIG. 26 the recess 121 communicates with the internal space 107 of the elastic ring 105 via a passage 122 (FIG. 28); in embodiments where the explosive charges are arranged radially (FIG. 25) the recess 121 intersects the passage 106, i.e. directly communicates therewith.

The spherical end face 117 of the rod 115a bears against the surface 10 of the bore 7 of the spherical ring 6 and blocks away an additional outlet passage 123 made in the male member 5 and establishing communication between the recess 121 and the ambient atmosphere.

To disconnect the pipes, the explosive charge 109 (FIG. 30) is exploded, e.g. by inserting a rod 124 with a pointed end through a hole 125 in the screw element 113 and striking the primer with this pointed end. The explosion of the charge 109 sends pressurized gas through the passage 106 into the internal space 107 of the elastic ring 105. The latter expands and depresses the locking elements 25 into the grooves 26 of the spherical ring, against the resistance of the springs 70 that are being compressed.

As the male member 5 is pulled out from the bore 7 of the spherical ring 6 (the male member 5 being displaced in a direction indicated with an arrow line B in FIG. 31), a moment comes when the exhaust valve 115 becomes positioned above the free end face 18 of the spherical ring 6, and the spring 116 displaces the now released rod 115a, whereby the passage 123 (FIGS. 31 and 32) becomes open. Now the internal space 107 of the elastic ring 105 communicates with ambient air through the recess 121 and passage 122, and the explosion-originated gases leave into the ambient atmosphere, whereby the elastic ring 105 contacts into its initial position and shape, in which way the joint is prepared for successive assembling.

To prevent the hollow elastic ring 105 being caught in the gap between the bevel 41 and the upper transverse side 31 of the groove 26 of the spherical ring 6 (FIG. 31) at disassembling, the ring 105 has a longitudinal dimension in cross-section which is smaller than the height of the cylindrical surface 35 of the locking member 25, and the exhaust valve is positioned at such a distance from the lower edge 30a of the groove 30 in the male member 5, which provides for and ensures timely opening operating of this valve, i.e. placing of the rod 115a above the end face 18 of the spherical ring 6 when at lifting of the male member the ring 105 reaches the lower edge 41a of the bevel 41 of the locking member 25.

The ring 105 cannot be expanded by the explosion-originated gases as long as the male member 5 is outside of the spherical ring 6, since if then this is the case, the spring 116 urges the rod 115a of the exhaust valve to its outermost position, and the internal space 107 of the elastic ring 105 communicates with ambient air. As the male member 5 is introduced into the spherical ring 6, the spherical end 117 of the rod 115a of the spherical ring 6, and the rod 115a is driven into its innermost position blocking away the additional outlet passage 123 (the internal space 107 of the ring 105 is disconnected from ambient air).

To prevent the pressure of the explosive-originated gases being built up in the space 107 above a permissible value, the male member 5 further incorporates a safety valve 126 (FIG. 33) including a plunger 127 urged by a compression spring 128. The plunger and the spring are accommodated in a longitudinally extending cylindrical space 129 within the male member 5 closed with a screw element 130. The space 129 communicates with ambient air via a passage 131 and also communicates via a passage 132 with the space 107 in the ring 105. In normal operation, i.e. at permissible pressure the passage 132 is blocked away with the plunger 127 and does not communicate with the passage 131.

What we claim is:

1. A pivotal pipe joint comprising: a female member secured to the end of one of a pair of pipes to be connected; a spherical socket in said female member, coaxial with said one pipe; a spherical ring receivable in said spherical socket of said female member and having an external spherical surface congruent with said surface of said socket and an internal cylindrical surface defining the bore of said ring; grooves made in said spherical ring; a bore made in said female member extending coaxially with said spherical socket and having two diametrically opposite longitudinal grooves on its surface through which said spherical ring is adapted to be inserted into said spherical socket and remove therefrom; a male member having one end secured to the end of the other pipe of said pair, said male member being receivable upon connection of said pipes in said bore of said spherical ring coaxially therewith, the external cylindrical surface of said male member being complementary to said cylindrical surface of said bore of said spherical ring, the opposite free end of said male member being receivable in said socket of said female member; retaining means securing said spherical ring in said socket of said female member coaxially therewith at an initial stage of connection of said pipes, said retaining means including at least two spring-urged retaining members each respectively positionable in ports formed in said spherical ring, said ports being located intermediate the grooves in said spherical ring, said retaining means being cooperable with recesses formed in the spherical surface of said socket so as to lock said spherical ring in said socket; said retaining means being cooperable with the male member so as to disjoin said spherical ring and said female member at a final stage of connection of said pipes; grooves made in said external surface of said male member and positioned at the final stage of connection of said pipes to face said grooves in said spherical ring so that their respective edges are aligned; spring-urged locking means effecting connection of said male member and said spherical ring upon said male member having been received in said bore of said spherical ring, with said locking means being accommodated simultaneously in said grooves of said spherical ring and said grooves of said male member; sealing means for sealing away the surfaces of said socket of said female member and said male member.

2. A pivotal pipe joint as claimed in claim 1, wherein said spherical ring is provided on the face thereof, facing said pipe carrying said female member, under said grooves of said spherical ring with a shoulder having mounted thereon said sealing means compressable between the respective surfaces of said male member and said socket of said female member.

3. A pivotal pipe joint as claimed in claim 1, wherein each said retaining member includes a rotatable double-arm lever with lugs on the ends thereof, one said end of said lever being spring-urged and said lug of said end having a spherical portion positioned to be acted upon by said male member, said lug of the other said end being receivable in said recess in said spherical surface of said socket of said female member at an initial stage of connection of said pipes, the urging of said end of said lever being effected by a T-shaped leaf spring of which one end abuts against said end of said lever, having said spherical portion, the other end of said spring being received in inclined slots cut in the walls of said additional ports of said spherical ring, parallel with the plane of rotation of said double-arm lever.

4. A pivotal pipe joint as claimed in claim 1, wherein said grooves of said spherical ring and of said male member are in the form of rectangular recesses, said locking means being accommodated in said recesses of said male member and being depressable therein by said spherical ring at relative displacement between said male member and said spherical ring along their common axis, said ring having an internal bevel, each said locking means including a curvilinear bar of which the side facing the cylindrical surface of said bore of said spherical ring has a radius of curvature not greater than the radius of curvature of the external cylindrical surface of said male member, the bottom portion of said side having a chamfer for cooperation with said internal bevel of said spherical ring at depressing of said bar, the side of said bar, facing the bottom of said groove of said male member, having a slot running the entire height of said side, said slot accommodating therein a projection of a leaf spring of which the ends abut against said bottom of said slot, whereby said spring urges said bar, said bar having made in the end faces thereof elongated grooves, the longitudinal walls of said groove in said male member having made therein through holes opening into said groove and to the cylindrical surface of said male member, adjoining said spherical ring, said holes having pins pressure-fit therein so that the ends of said pins project into said grooves of said male member and are received in said elongated grooves in said end faces of said bar, retaining the latter from falling out from said groove of said male member.

5. A pivotal pipe joint as claimed in claim 4, wherein, to render said joint capable of torque transmission, said spring-urged locking means being accommodated simultaneously in said recess in said male member and said recess in said spherical ring, said spherical surface of said spherical ring, adjoining said spherical surface of said socket of said female member, has cut therein a pair of diametrally arranged recesses with planar longitudinal walls, each said recess receiving therein an insert shaped as a rectangular parallelepiped with a cylindrical bore adapted to receive therein a tail portion of a screw threaded into a through threaded opening made in said female member.

6. A pivotal pipe joint as claimed in claim 4, wherein the cylindrical surface of said spherical ring, adjoining said male member, has cut therein longitudinal open passages communicating with the respective ones of said grooves of said spherical ring and opening to the free end face of said spherical ring, said open passages being adapted to have introduced thereinto means for depressing said curvilinear bars into said grooves of said male member at disconnection of said pipes, the side of each said curvilinear bar, facing said spherical ring, having a locally chamfered portion, above which the respective one of said longitudinal open passages is situated, said chamfered portion being thus positioned to be acted upon by said bar depressing means.

7. A pivotal pipe joint as claimed in claim 6, wherein the end face of said sleeve, facing said locking means, is provided with elongated projections having each an internal bevel for cooperation with said chamfered portions of said locking means, as the latter are being depressed during disconnection of said pipes.

8. A pivotal pipe joint as claimed in claim 6, wherein said means for depressing said locking means at disconnection of said pipes includes a sleeve received about said male member for axial displacement therealong at disconnection of said pipes, for cooperation with said chamfers of said locking means, the face end of said sleeve, facing said locking means, having an external bevel.

9. A pivotal pipe joint as claimed in claim 8, wherein said sleeve has in the upper portion thereof a lug having made therein radial recesses accommodating therein spring-biased rods retaining said sleeve against displacement along said male member, when said pipes are not to be disconnected, said male member having an annular shoulder onto which said spring-urged rods of said sleeve bear by their lateral surfaces, said shoulder having a chamfer of the same sense at that of said bevel of said sleeve.

10. A pivotal pipe joint as claimed in claim 1, wherein said ports in said spherical ring extend perpendicularly to the generatrix of said bore of said ring.

11. A pivotal pipe joint, as claimed in claim 1, wherein said ports extend along the generatrix of said bore of said ring.

12. A pivotal pipe joint as claimed in claim 11, wherein said ports in said spherical ring having said grooves thereof in the form of recesses are partly overlapped on the side of said male member by the body of said ring, the remaining portions of said additional port, adapted for projection therethrough of said lever of the respective one of said retaining members, being situated intermediate of said end face of said ring with said shoulder for supporting said sealing means, and said grooves for association with said locking means, said recess in said spherical surface of said socket of said female member, adapted to receive therein said lug of said lever.

13. A pivotal pipe joint as claimed in claim 1, wherein said grooves of said male member form a common annular groove, each said groove in said spherical ring being in the form of a port of a rectangular shape, accommodating said locking means therein, said locking means being depressable by said male member into said port, said port having made in the lateral walls thereof blind grooves opening to the spherical surface of said ring, the longitudinal walls of said port having made therein grooves in the form of holes opening to the spherical surface of said ring.

14. A pivotal pipe joint as claimed in claim 13, wherein said annular groove of said male member accommodates an elastic hollow annulus, said male member having cut therein passage means communicating with the internal space of said elastic annulus and also communicating with the space above said spherical ring, said passage means being adapted for supplying a working fluid into said internal space of said elastic annulus, to expand said annulus and to make it act upon said locking means, said annulus acting as said means for depressing said locking means into said grooves of said spherical ring at disconnection of said pipes.

15. A pivotal pipe joint as claimed in claim 14, wherein a space is provided at the inlet of each one of said passages, said space accommodating an explosive charge capable of being exploded to generate a gaseous working fluid, said internal space of said elastic annulus communicating with the ambient atmosphere through additional passage means provided in said male member and associated with safety and exhaust valve means, to effect exhausting of said working fluid from said annulus at disconnection of said pipes.

16. A pivotal pipe joint as claimed in claim 13, wherein the external cylindrical surface of said male member has cut therein longitudinal open passages communicating with said annular groove of said male member, said passages being adapted to have introduced thereinto means for depressing said locking means into the respective ones of said ports of said spherical ring at disconnection of said pipes.

17. A pivotal pipe joint, as claimed in claim 13, wherein each said locking means includes a curvilinear bar of which the side facing said male member having a radius of curvature that is not smaller than the radius of curvature of said bore in said spherical ring, the top portion of said side having a chamfer cut therein, the top and bottom sides of said bar having projections receivable in said blind grooves of said port of said spherical ring to retain said bar in said port of said spherical ring from falling out therefrom, the side of said bar, facing said spherical surface of said socket of said female member, having cut therein a longitudinal slot accommodating therein a leaf spring urging said bar, said spring having the ends thereof received in said grooves in said longitudinal walls of said port of said spherical ring, a recess being cut into the control portion of the longitudinal slot in said bar, said leaf spring having a projection receivable in said recess.

18. A pivotal pipe joint as claimed in claim 17, wherein said free end of said male member has an external bevel adapted for cooperation with said chamfer of said curvilinear bar at depressing of said bar into said port of said spherical ring and for engagement with the surface of said socket in said female member.

19. A pivotal pipe joint as claimed in claim 17, wherein said longitudinal slot of said bar has a varying depth, said depth increasing from the centre of said bar towards the ends thereof.

* * * * *